United States Patent
Hirose et al.

(10) Patent No.: US 10,364,161 B2
(45) Date of Patent: Jul. 30, 2019

(54) CERAMIC MATERIAL AND RESISTIVE ELEMENT

(71) Applicant: Murata Manufacturing Co., Ltd., Nagaokakyo-shi, Kyoto-fu (JP)

(72) Inventors: Sakyo Hirose, Nagaokakyo (JP); Hayato Katsu, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 16/183,774

(22) Filed: Nov. 8, 2018

(65) Prior Publication Data

US 2019/0077677 A1   Mar. 14, 2019

Related U.S. Application Data

(63) Continuation of application No. PCT/JP2017/018896, filed on May 19, 2017.

(30) Foreign Application Priority Data

May 24, 2016 (JP) ................... 2016-103330

(51) Int. Cl.
| | |
|---|---|
| C01G 45/12 | (2006.01) |
| H01C 7/04 | (2006.01) |
| C04B 35/50 | (2006.01) |
| H01C 7/00 | (2006.01) |
| H01C 1/14 | (2006.01) |

(52) U.S. Cl.
CPC .......... *C01G 45/1264* (2013.01); *C04B 35/50* (2013.01); *H01C 7/008* (2013.01); *C01P 2002/52* (2013.01); *C01P 2006/32* (2013.01); *C01P 2006/40* (2013.01); *H01C 1/1413* (2013.01); *H01C 7/04* (2013.01); *H01C 7/043* (2013.01)

(58) Field of Classification Search
CPC .. H01C 1/1413; H01C 7/043; C01G 45/1264; C01P 2002/52
See application file for complete search history.

(56) References Cited

U.S. PATENT DOCUMENTS

| | | | |
|---|---|---|---|
| 6,054,403 A | 4/2000 | Kawase et al. | |
| 6,469,612 B2* | 10/2002 | Nakayama | B32B 18/00 252/519.1 |
| 8,624,703 B2* | 1/2014 | Miura | H01C 7/008 338/22 R |
| 2002/0074657 A1 | 6/2002 | Nakayama et al. | |

(Continued)

FOREIGN PATENT DOCUMENTS

| | | |
|---|---|---|
| JP | 11-116334 A | 4/1999 |
| JP | 2002-087882 A | 3/2002 |

(Continued)

OTHER PUBLICATIONS

Official Communication issued in International Patent Application No. PCT/JP2017/018896, dated Aug. 1, 2017.

*Primary Examiner* — Kyung S Lee
(74) *Attorney, Agent, or Firm* — Keating & Bennett, LLP

(57) ABSTRACT

A ceramic material has a composition represented by the formula: $La_{1-x-y}AE_yMnO_3$ in which AE is at least one of Ca and Sr; x satisfies $0 < x \leq$ about 0.20; and y satisfies $0 < y \leq$ about 0.10.

8 Claims, 2 Drawing Sheets

(56) References Cited

U.S. PATENT DOCUMENTS

2008/0311428 A1* 12/2008 Mori ................. C01G 45/1264
  428/701
2010/0134237 A1* 6/2010 Miura ................. C04B 35/016
  338/22 R
2013/0221475 A1 8/2013 Hirose

FOREIGN PATENT DOCUMENTS

JP 2002-121071 A 4/2002
JP 2009-173484 A 8/2009
WO 2012/056797 A1 5/2012

* cited by examiner

CERAMIC MATERIAL AND RESISTIVE ELEMENT

CROSS REFERENCE TO RELATED APPLICATIONS

This application claims the benefit of priority to Japanese Patent Application No. 2016-103330 filed on May 24, 2016 and is a Continuation Application of PCT Application No. PCT/JP2017/018896 filed on May 19, 2017. The entire contents of each application are hereby incorporated herein by reference.

BACKGROUND OF THE INVENTION

1. Field of the Invention

The present invention relates to a ceramic material and a resistive element including the ceramic material.

2. Description of the Related Art

In electric automobiles and hybrid automobiles that are becoming more prevalent in recent years, numerous modules and motors that handle a large electric current are used. In these modules and the like, an inrush current is generated when the power is turned on (or when the motor is started) and there is a fear that, when an excessive amount of inrush current flows through a module or the like, destruction of an electronic component and IC located in the inside thereof may occur, so that a countermeasure to cope with this problem is needed. As an element for performing a countermeasure against such an inrush current, use of a thermistor element has been considered.

When a thermistor element is used, since the inrush current that is generated when the motor is started in an electric automobile may reach several hundred A, an excellent inrush current resistance is demanded and, since the thermistor element needs to be operated at a comparatively high temperature, for example, at 120° C. to 250° C., a high reliability is also demanded. Further, when the electrical resistance of the element itself is high, a sufficient electric power may not be supplied to the motor, and the battery may be excessively consumed, so that the electrical resistance of the element itself must be reduced. Therefore, as a thermistor material, it is preferable to use a material having a low electrical resistance and having a property such that the electrical resistance rapidly decreases at around 100° C. to 150° C. (that is, a material having a large B-constant).

Conventionally, as a thermistor element for suppressing an inrush current, an NTC (Negative Temperature Coefficient) thermistor is known in the art. However, an NTC thermistor having a low specific electrical resistance does not provide a sufficiently large change in electrical resistance between a low-temperature state and a high-temperature state (that is, has a small B-constant), thus leading to disadvantages, such as a comparatively large electric power loss caused by residual electrical resistance while a stationary electric current is flowing (on-state, high-temperature state). Further, an NTC thermistor providing a sufficiently large change in electrical resistance between a low-temperature state and a high-temperature state (that is, having a large B-constant) has a large specific electrical resistance, thus raising a problem such that the element size increases in order to reduce the element electrical resistance. This is due to general presence of correlation between a specific electrical resistance and a B-constant of an electroconductive material and, when the specific electrical resistance is reduced, the B-constant decreases, so that it is difficult to attain both a low specific electrical resistance and a high B-constant at the same time.

Therefore, as a thermistor element for suppressing an inrush current, use of a CTR (Critical Temperature Resistor) is studied. A CTR has characteristics such that, when the temperature is increased, the resistor exhibits a rapid decrease in electrical resistance at a certain temperature or in a certain temperature range (hereafter simply referred to as "CTR characteristics") and has an extremely large B-constant as compared with an NTC thermistor in which the electrical resistance gradually decreases as the temperature rises.

As a ceramic material having CTR characteristics, PCT International Publication No. 2012/056797 discloses a ceramic material having a structure represented by a chemical formula of $R1_{1-x}R2_xBaMn_2O_6$, and (1) x satisfies about $0.05 \leq x \leq$ about 1.0 when R1 comprises Nd and R2 comprises at least one of Sm, Eu, and Gd;

(2) x satisfies about $0.05 \leq x \leq$ about 0.8 when R1 comprises Nd and R2 comprises at least one of Tb, Dy, Ho, Er, and Y;

(3) x satisfies $0 \leq x \leq$ about 0.4 when R1 comprises at least one of Sm, Eu, and Gd and R2 comprises at least one of Tb, Dy, Ho, and Y; and (4) x satisfies $0 \leq x \leq$ about 1.0 when R1 comprises at least one of Sm, Eu, and Gd and R2 comprises at least one of Sm, Eu, and Gd, which is not in R1.

The ceramic material disclosed in PCT International Publication No. 2012/056797 is an A-site aligned Mn compound in which a rare-earth element and barium are aligned at the A-site in a perovskite structure, and exhibits CTR characteristics. It is disclosed in PCT International Publication No. 2012/056797 that this ceramic material shows a rapid change in electrical resistance at around 100° C. as shown, for example, in FIG. 2 of this document, and is suitable in configuring a thermistor element for suppressing an inrush current.

As a result of experiments performed on the ceramic material disclosed in PCT International Publication No. 2012/056797, the inventor of preferred embodiments of the present invention has discovered that, although this material has a low electrical resistance and exhibits a rapid change in electrical resistance, the electrical resistance of this material rises by a heat-cycle test and a test of leaving the material to stand at a high temperature. When the ceramic material is used in an element for suppressing an inrush electric power, the element repeats a temperature hysteresis in which the temperature rises by self-heat generation to provide a low electrical resistance during the energization, whereas the temperature is reduced to provide a high electrical resistance when the energization is shut off, thus generating a heat cycle. Further, during the energization, the element is maintained in a high-temperature state. Therefore, an increase in the electrical resistance value of the element for suppressing an inrush electric power is generated, and this may cause poor operation of the module.

SUMMARY OF THE INVENTION

Preferred embodiments of the present invention provide ceramic materials each having a low specific electrical resistance and a high B-constant and that is capable of obtaining an excellent heat-cycle resistance and a high-temperature resistance (that is, an excellent reliability).

The inventor of preferred embodiments of the present invention has experimented with a solid solution of LaMnO$_3$ and at least one of CaMnO$_3$ and SrMnO$_3$ in order to reduce the specific electrical resistance of the element. When a small amount of CaMnO$_3$ or CaMnO$_3$ is added to LaMnO$_3$ to produce a solid solution, a p-type semiconductor is provided, and the specific electrical resistance decreases. However, similar to a general material, this material raises a problem in that, when the resistivity is reduced, the B-constant decreases. However, as a result of further experimentation, the inventor of preferred embodiments of the present invention has discovered that, by further introducing a La deficiency in addition to adding at least one of Ca and Sr to produce a solid solution, the low specific electrical resistance and the high B-constant are made compatible with each other, thus resulting in preferred embodiments of the present invention. According to a preferred embodiment of the present invention, a ceramic material is provided that has a composition represented by the formula of: La$_{1-x-y}$AE$_y$MnO$_3$ in which AE is at least one of Ca and Sr; x satisfies 0<x≤about 0.20; and y satisfies 0<y≤about 0.10.

According to a preferred embodiment of the present invention, a ceramic material includes a composite oxide of La, AE, and Mn, wherein AE is at least one of Ca and Sr; a sum of a molar content of La and a molar content of AE is smaller than about 100 parts by mol and about 80 parts by mol or larger relative to 100 parts by mol of Mn; and the molar content of AE is larger than 0 parts by mol and is about 10 parts by mol or smaller relative to 100 parts by mol of Mn.

According to a preferred embodiment of the present invention, a resistive element includes an element main body, and at least two electrodes disposed such that at least a portion of the element main body is interposed therebetween, wherein the element main body is composed of a ceramic material according to a preferred embodiment of the present invention.

According to preferred embodiments of the present invention, a ceramic material having NTC characteristics and having a low specific electrical resistance, exhibiting a rapid change in electrical resistance by temperature rise, and being capable of achieving an excellent reliability (in more detail, an excellent heat-cycle resistance) is provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
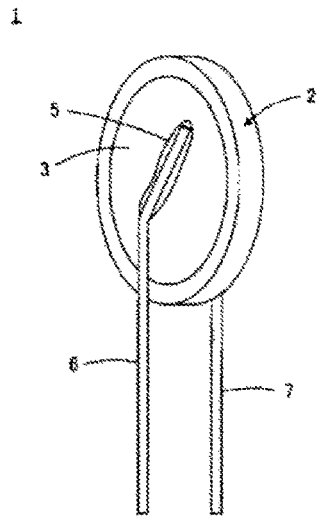
FIG. 1 is a perspective view illustrating an outer appearance of a resistive element according to a preferred embodiment of the present invention.

Hereafter, ceramic materials and resistive elements including the ceramic materials according to preferred embodiments of the present invention will be described in detail with reference to the drawings.

The ceramic material according to a preferred embodiment of the present invention is a composite oxide of La, AE, and Mn (here, AE is either one of or both of Ca and Sr). The composition of the composite oxide may be identified by a method known in the art. For example, the composition may be identified by inductively coupled plasma atomic emission spectroscopy (ICP-AES), inductively coupled plasma mass spectroscopy (ICP-MS), X-ray fluorometry (XRF), or other suitable methods.

In a preferred embodiment of the present invention, the ceramic material has a composition represented by the formula of: La$_{1-x-y}$AE$_y$MnO$_3$ in which AE is at least one of Ca and Sr; x satisfies 0<x≤about 0.20; and y satisfies 0<y≤about 0.10, for example. Preferably, AE is Ca or Sr.

In another preferred embodiment of the present invention, x satisfies about 0.03≤x≤about 0.20, and y satisfies about 0.005≤y≤about 0.10.

In another preferred embodiment of the present invention, preferably, x satisfies about 0.03≤x≤about 0.20, and y satisfies about 0.03≤y≤about 0.10, for example, and AE is preferably Ca.

In another preferred embodiment of the present invention, preferably (i) x satisfies about 0.03≤x≤about 0.20, and y satisfies about 0.005≤y≤about 0.07, or (ii) x satisfies about 0.03≤x≤about 0.15, and y satisfies about 0.07<y≤about 0.10, for example.

In another preferred embodiment of the present invention, preferably, (i) x satisfies about 0.03≤x≤about 0.20, and y satisfies about 0.03≤y≤about 0.07, or (ii) x satisfies about 0.03≤x≤about 0.15, and y satisfies about 0.07<y≤about 0.10, for example, and AE is preferably Ca.

In another preferred embodiment of the present invention, preferably, x satisfies about 0.08≤x≤about 0.20, for example. By setting x to be within such a range, the linear thermal expansion coefficient of the ceramic material is able to be made small. More preferably, x satisfies about 0.08≤x≤about 0.12, and y is about 0.03, for example.

Here, although the oxygen amount is defined to be 3 in the chemical formula of La$_{1-x-y}$AE$_y$MnO$_3$ representing the composition of the ceramic material according to a preferred embodiment of the present invention, such an oxygen amount may be an indefinite ratio. In other words, in the above chemical formula, the oxygen amount may be a little smaller or a little larger than 3 in accordance with x, y, or the type of AE. Preferred embodiments of the present invention permit such an oxygen amount, and the advantageous effects of preferred embodiments of the present invention are able to be achieved when x and y are within the ranges described above.

In a ceramic material according to a preferred embodiment of the present invention including a composite oxide of La, AE, and Mn, AE is at least one of Ca and Sr; a sum of the molar content of La and the molar content of AE is preferably smaller than about 100 parts by mol and about 80 parts by mol or larger relative to 100 parts by mol of Mn; and the molar content of AE is preferably larger than 0 parts by mol and about 10 parts by mol or smaller relative to 100 parts by mol of Mn, for example. AE is preferably Ca or Sr.

In another preferred embodiment of the present invention, preferably, the sum of the molar content of La and the molar content of AE is preferably about 97 parts by mol or smaller and about 80 parts by mol or larger relative to 100 parts by mol of Mn, and the molar content of AE is preferably about 0.5 part by mol or larger and about 10 parts by mol or smaller relative to 100 parts by mol of Mn, for example.

In another preferred embodiment of the present invention, preferably, the sum of the molar content of La and the molar content of AE is preferably about 97 parts by mol or smaller and about 80 parts by mol or larger relative to 100 parts by mol of Mn, and the molar content of AE is preferably about 3 parts by mol or larger and about 10 parts by mol or smaller relative to 100 parts by mol of Mn, for example. AE is preferably Ca.

In another preferred embodiment of the present invention, preferably, (i) the sum of the molar content of La and the molar content of AE is preferably about 97 parts by mol or smaller and about 80 parts by mol or larger relative to 100 parts by mol of Mn, and the molar content of AE is preferably about 0.5 part by mol or larger and about 7 parts by mol or smaller relative to 100 parts by mol of Mn, or (ii) the sum of the molar content of La and the molar content of AE is preferably about 97 parts by mol or smaller and about 85 parts by mol or larger relative to 100 parts by mol of Mn, and the molar content of AE is preferably larger than about 7 parts by mol and about 10 parts by mol or smaller relative to 100 parts by mol of Mn, for example.

In another preferred embodiment of the present invention, preferably, (i) the sum of the molar content of La and the molar content of AE is preferably about 97 parts by mol or smaller and about 80 parts by mol or larger relative to 100 parts by mol of Mn, and the molar content of AE is preferably 3 parts by mol or larger and about 7 parts by mol or smaller relative to 100 parts by mol of Mn, or (ii) the sum of the molar content of La and the molar content of AE is preferably about 97 parts by mol or smaller and about 85 parts by mol or larger relative to 100 parts by mol of Mn, and the molar content of AE is preferably larger than about 7 parts by mol and about 10 parts by mol or smaller relative to 100 parts by mol of Mn, for example. AE is preferably Ca.

In another preferred embodiment of the present invention, preferably, the sum of the molar content of La and the molar content of AE is preferably about 92 parts by mol or smaller and about 80 parts by mol or larger relative to 100 parts by mol of Mn, for example. By setting the sum of the molar content of La and the molar content of AE to be within such a range, the linear thermal expansion coefficient of the ceramic material is able to be made small. More preferably, the sum of the molar content of La and the molar content of AE is about 92 parts by mol or smaller and about 88 parts by mol or larger relative to 100 parts by mol of Mn, and the molar content of AE is about 3 parts by mol relative to 100 parts by mol of Mn.

In the composite oxide of La, AE, and Mn, the molar content of oxygen atoms is typically 3 parts by mol relative to 1 part by mol of Mn. However, the oxygen amount in such a composite oxide may be an indefinite ratio. Even with a composite oxide including oxygen at such an indefinite ratio, that is, even with a composite oxide in which the molar content of oxygen atoms is a little smaller or a little larger than 3 parts by mol relative to 1 part by mol of Mn, the advantageous effects of preferred embodiments of the present invention are able to be achieved when the molar contents of Mn, La, and AE are within the ranges described above.

In the ceramic material, the specific electrical resistance lowers when the temperature is increased.

The ceramic material has a low specific electrical resistance, especially a low specific electrical resistance at room temperature. In more detail, the specific electrical resistance of the ceramic material at about 25° C. may be, for example, about 5 Ω·cm or less, preferably about 2 Ω·cm or less, and more preferably about 1 Ω·cm or less. This improves a degree of freedom in designing the element size (shape) and makes it possible to fabricate the element comparatively easily. This improves a property of response to the inrush current and effectively reduces or minimizes the inrush current. However, preferred embodiments of the present invention are not limited to such a purpose or use.

As described above, the ceramic material exhibits a large change in electrical resistance by temperature change. The magnitude of the change in electrical resistance by temperature change is able to be evaluated using, as an index, a B-constant that is calculated by the following formula.

Formula 1

$$B\text{-constant}=\ln(R_1/R_2)/(1/T_1-1/T_2) \qquad (1)$$

In the formula, $R_1$ and $R_2$ represent electrical resistance values (Ω) at the temperature (K) of $T_1$ and $T_2$, respectively.

In the ceramic material, when an electrical resistance value is measured at an interval of about 5° C. within a range from about 25° C. to about 200° C., the B-constant between about 25° C. and about 150° C., that is, the B-constant obtained based on the above formula assuming that $T_2$=about 150° C. and $T_1$=about 25° C., is, for example, about 2000 or more and is preferably about 2400 or more. This effectively reduces or minimizes the inrush current and effectively reduces the electric power loss caused by residual electrical resistance while a stationary electric current is flowing (on-state). Hereafter, in the present specification, the "B-constant" refers to a B-constant obtained based on the above Formula (1) assuming that $T_1$=about 25° C. and $T_2$=about 150° C.

Preferably, the above-described ceramic material has, for example, a specific electrical resistance of about 2 Ω·cm or less and a B-constant of about 2000 or more, and has a B-constant of about 2400 or more if the specific electrical resistance is about 1 Ω·cm or more and about 2 Ω·cm or less, and preferably has a B-constant of about 2000 or more if the specific electrical resistance is about 1 Ω·cm or less.

As described above, the ceramic material according to preferred embodiments of the present invention has a low specific electrical resistance and a high B-constant. This appears to be because, although preferred embodiments of the present invention are not constrained by any theory, a strain is generated in the crystal structure by introducing an La deficiency, and randomness is introduced in Mn3d-O2p-Mn3d which is a conduction path, resulting from suitable inhibition of the hopping conduction, so that the hopping probability is affected by temperature, such that a low specific electrical resistance and a high B-constant are obtained.

Further, in the ceramic material, a change in electrical resistance between before and after a heat cycle test is effectively prevented, thus exhibiting a high heat-cycle resistance and obtaining an excellent reliability. In more detail, even when the ceramic material is subjected to a heat cycle test in a temperature range of, for example, about −25° C. to about 240° C., the ratio of change in the electrical resistance between before and after the heat cycle test is reduced to about 10% or less. In a similar manner, even when the ceramic material is left to stand at a high temperature of about 250° C., an excellent high-temperature resistance is obtained.

The ceramic material may be produced by a suitable combination of methods conventionally known in the technical field of composite oxides.

Schematically, the ceramic material may be produced by weighing a material including calcium or strontium and oxygen (for example, oxide, carbonate, hydroxide, or other suitable material; the same applies hereafter) as an AE source (that is, a Ca source or a Sr source), a material including lanthanum and oxygen as a La source, and a material including manganese and oxygen as a Mn source so as to obtain a desired ratio, and mixing and firing these (suitably together with a binder or other ingredients).

The ceramic material may be used for any purpose or use. However, the ceramic material may be preferably used for a resistive element. In more detail, in a resistive element including an element main body and at least two electrodes disposed such that at least a portion of the element main body is interposed therebetween, the ceramic material may be used for the element main body. The resistive element may be suitably used particularly as a thermistor element to reduce or minimize an inrush current.

The resistive element may have any suitable shape and structure. Referring to FIG. 1, for example, a resistive element 1 includes a plate-shaped (disk-shaped in the illustrated example; however, the shape is not limited thereto) element main body 2 made of the above-described ceramic material, and a pair of electrodes provided respectively on mutually opposed principal surfaces of the element main body 2. In FIG. 1, only one electrode 3 is shown. The other electrode, not shown, is opposes the electrode 3 shown. A leading wire 6 may be connected to the electrode 3 shown in the figure via, for example, a solder 5, and a leading wire 7 may likewise be connected via a solder to the other electrode, not shown. The resistive element 1 may be mounted on a wiring substrate, not shown, with the leading wires 6 and 7 interposed therebetween, and may be advantageously used as a thermistor element to reduce or minimize an inrush current, that is, as a power thermistor.

EXAMPLES

Hereafter, the ceramic material and the resistive element according to preferred embodiments of the present invention will be described in more detail by way of Examples.

In order to evaluate the electric properties and reliability, ceramic material samples were prepared by the following method.

As starting raw materials, manganese oxide ($Mn_3O_4$), calcium carbonate ($CaCO_3$), strontium carbonate ($SrCO_3$), and lanthanum oxide ($La_2O_3$) respectively having a purity of about 99.9% or more were used. These starting raw materials were weighed so as to obtain a composition shown in Table 1 (if the AE is Ca) or in Table 2 (if the AE is Sr) after firing, put into a pot container of about 500 ml together with partially stabilized zirconium oxide (PSZ) balls having a diameter of about 2 mm, pure water, and a dispersant, and ground and mixed for about 16 hours. A slurry obtained by this operation was dried, granulated, and calcined at about 900° C. for about 4 hours in an air atmosphere. To a calcined powder obtained by this operation, an organic solvent and a dispersant were added and they were made into a slurry using the PSZ balls, and the resultant slurry was subjected to a grinding and mixing treatment for about 16 hours. To this, a plasticizer and an organic binder were added, and the resultant was further mixed for about 6 hours to prepare a slurry for forming a sheet. With use of the slurry prepared by this process, a green sheet was formed by the doctor blade method and cut into short strips, and the obtained short strips were stacked and press-bonded, so as to prepare a block (green body). Thereafter, the block was cut so as to have a size of about 5 mm×about 5 mm×about 0.5 mm after firing, heated at about 450° C. in an air atmosphere so as to be subjected to a treatment of removing the binder, and consecutively fired at about 1250° C. to about 1300° C. for about 4 hours in an air atmosphere. To the mutually opposed principal surfaces of a sintered body obtained by this operation, an Ag paste was applied and attached by performing a heat treatment at about 700° C. for about 10 minutes, so as to form an electrode.

The electric properties were evaluated as follows on the samples prepared in the above-described manner.

Using an electrical resistance measurement device (Keithley 2430) and a temperature bath (manufactured by Despatch Industries G.K.), evaluation was made on the temperature-dependence of electrical resistance by the four-terminal method. The temperature range was set to be from room temperature (about 25° C.) to about 200° C. From a measured electrical resistance value, a specific electrical resistance was calculated. Also, from the temperature-dependence of electrical resistance values measured at an interval of about 10° C., the B-constant was calculated based on the above-described Formula (1). In this experiment example, samples having a B-constant of about 2400 or more if the specific electrical resistance at room temperature (about 25° C.) exceeded about 1 Ω·cm and was about 2 Ω·cm or less, or having a B-constant of about 2000 or more if the specific electrical resistance was about 1 Ω·cm or less, were determined as having a low specific electrical resistance and a high B-constant, and were determined as "pass". The specific electrical resistance at room temperature (about 25° C.) and the B-constant determined from the electrical resistance values at about 25° C. ($T_1$) and about 150° C. ($T_2$) are shown in Tables 1 and 2.

In addition, samples determined as "pass" in the above-described determination with respect to the specific electrical resistance at room temperature and the B-constant were further subjected to a heat cycle test.

In this experiment example, a temperature-raising and temperature-lowering operation was repeated about 300 times in a temperature range of about −25° C. to about 240° C. in the heat cycle test, and samples in which the ratio of change in electrical resistance between before and after the test was about 10% or less were determined as "pass". The results thereof are shown together in Table 1 to 3.

TABLE 1

| | | | Characteristics test results | | |
|---|---|---|---|---|---|
| Sample | $La_{1-x}Ca_yMnO_3$ | | Specific electrical resistance | | |
| No. | x | y | (Ω · cm) | B-constant | Reliability |
| 1* | 0.000 | 0.000 | 5.50 | 3500 | X |
| 2* | 0.000 | 0.010 | 4.20 | 2900 | X |
| 3* | 0.000 | 0.030 | 2.30 | 2800 | X |
| 4* | 0.000 | 0.050 | 1.30 | 2200 | X |
| 5* | 0.000 | 0.070 | 0.75 | 1950 | X |
| 6* | 0.000 | 0.100 | 0.42 | 1720 | X |
| 7* | 0.000 | 0.150 | 0.39 | 1600 | X |
| 8 | 0.030 | 0.005 | 2.00 | 2400 | ○ |
| 9 | 0.080 | 0.005 | 1.90 | 2500 | ○ |
| 10 | 0.100 | 0.005 | 1.80 | 2550 | ○ |
| 11 | 0.150 | 0.005 | 1.20 | 2400 | ○ |
| 12 | 0.200 | 0.005 | 1.10 | 2400 | ○ |
| 13* | 0.300 | 0.005 | 1.00 | 2100 | X |
| 14 | 0.030 | 0.010 | 2.00 | 2450 | ○ |
| 15 | 0.080 | 0.010 | 1.80 | 2500 | ○ |
| 16 | 0.100 | 0.010 | 1.50 | 2550 | ○ |
| 17 | 0.150 | 0.010 | 1.10 | 2500 | ○ |
| 18 | 0.200 | 0.010 | 0.89 | 2300 | ○ |
| 19* | 0.300 | 0.010 | 0.79 | 2150 | X |
| 20 | 0.030 | 0.030 | 1.90 | 2800 | ○ |

TABLE 2

| Sample No. | $La_{1-x}Ca_yMnO_3$ | | Characteristics test results | | |
|---|---|---|---|---|---|
| | x | y | Specific electrical resistance (Ω·cm) | B-constant | Reliability |
| 21 | 0.080 | 0.030 | 1.50 | 2650 | ○ |
| 22 | 0.100 | 0.030 | 1.10 | 2500 | ○ |
| 23 | 0.150 | 0.030 | 0.80 | 2400 | ○ |
| 24 | 0.200 | 0.030 | 0.61 | 2200 | ○ |
| 25* | 0.300 | 0.030 | 0.52 | 2000 | × |
| 26 | 0.030 | 0.070 | 0.71 | 2300 | ○ |
| 27 | 0.080 | 0.070 | 0.68 | 2200 | ○ |
| 28 | 0.100 | 0.070 | 0.60 | 2200 | ○ |
| 29 | 0.150 | 0.070 | 0.57 | 2010 | ○ |
| 30 | 0.200 | 0.070 | 0.42 | 2000 | ○ |
| 31* | 0.300 | 0.070 | 0.38 | 1800 | × |
| 32 | 0.030 | 0.100 | 0.40 | 2100 | ○ |
| 33 | 0.100 | 0.100 | 0.38 | 2000 | ○ |
| 34 | 0.200 | 0.100 | 0.35 | 2000 | ○ |
| 35* | 0.030 | 0.150 | 0.38 | 2000 | × |
| 36* | 0.100 | 0.150 | 0.35 | 1900 | — |
| 37* | 0.200 | 0.150 | 0.31 | 1740 | — |

TABLE 3

| Sample No. | $La_{1-x}Sr_yMnO_3$ | | Characteristics test results | | |
|---|---|---|---|---|---|
| | x | y | Specific electrical resistance (Ω·cm) | B-constant | Reliability |
| 38 | 0.030 | 0.005 | 1.90 | 2500 | ○ |
| 39 | 0.200 | 0.005 | 1.20 | 2400 | ○ |
| 40* | 0.300 | 0.005 | 1.10 | 2000 | × |
| 41 | 0.030 | 0.010 | 1.80 | 2600 | ○ |
| 42 | 0.200 | 0.010 | 0.95 | 2400 | ○ |
| 43* | 0.300 | 0.010 | 0.80 | 2200 | × |
| 44 | 0.030 | 0.030 | 1.80 | 2800 | ○ |
| 45 | 0.200 | 0.030 | 0.75 | 2500 | ○ |
| 46* | 0.300 | 0.030 | 0.65 | 2400 | × |
| 47 | 0.030 | 0.070 | 0.82 | 2300 | ○ |
| 48 | 0.200 | 0.070 | 0.51 | 2100 | ○ |
| 49* | 0.300 | 0.070 | 0.35 | 1950 | × |
| 50 | 0.030 | 0.100 | 0.50 | 2200 | ○ |
| 51 | 0.200 | 0.100 | 0.42 | 2100 | ○ |
| 52* | 0.030 | 0.150 | 0.35 | 2000 | × |
| 53* | 0.200 | 0.150 | 0.29 | 1200 | — |

In Tables 1 to 3, samples denoted with "*" (Comparative Examples) are out of the scope of the present invention. In the "reliability" column, the symbol "○" represents "pass"; the symbol "×" represents "fail"; and the symbol "-" shows that the heat cycle test was not preformed.

Figure 2:
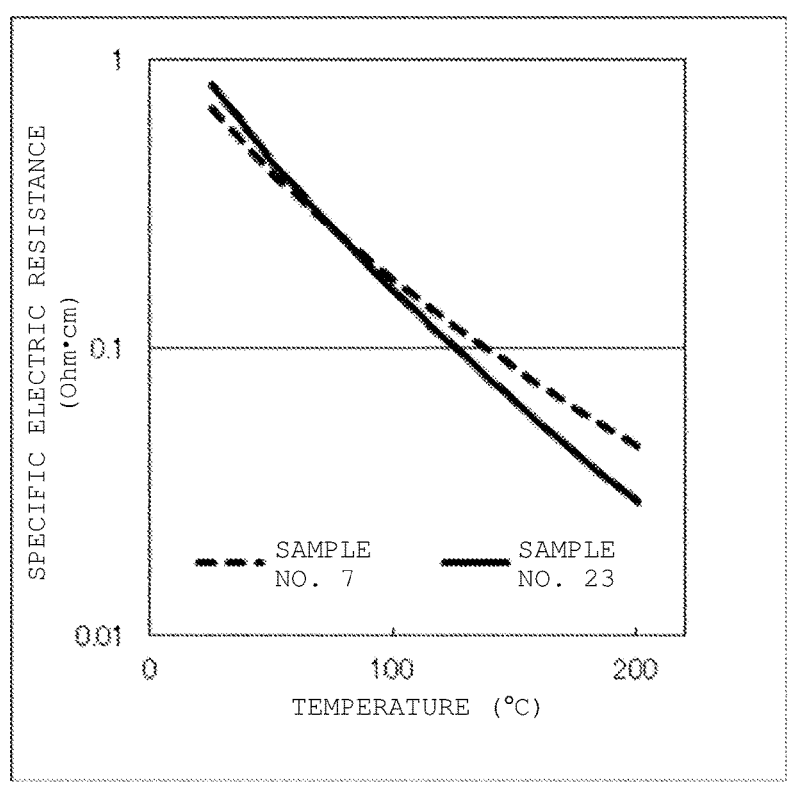
FIG. 2 is a graph showing a relationship between the temperature and the specific electrical resistance in Sample No. 7 and Sample No. 11 in the Examples.

Among the samples evaluated in the above, the temperature—electrical resistance characteristics of Sample Nos. 7 and 23 are shown in FIG. 2 as exemplifications.

In conventionally known Sample Nos. 1 to 7 in which La deficiency is not provided, a comparatively large B-constant was obtained when the specific electrical resistance is large. However, when Ca is added for the purpose of reducing the specific electrical resistance, the B-constant also decreases, and the B-constant was below the determination standard.

On the other hand, in the samples which are within the scope of the present invention, a low specific electrical resistance and a large B-constant were compatible with each other. As described above, the B-constant generally decreases as the specific electrical resistance decreases. In other words, there is a problem of a small ratio of change in electrical resistance when the temperature changes. However, referring to FIG. 2, in the sample (Sample No. 23) which is within the scope of the present invention, the specific electrical resistance at about 200° C. was smaller, thus showing that the electrical resistance changes more largely relative to the temperature, that is, the B-constant is larger, despite the fact that the specific electrical resistance at room temperature is a little higher than the specific electrical resistance of the sample (Sample No. 7) which is not within the scope of the present invention. From this, it appears that, by introduction of the La deficiency, the holes are introduced to increase the carrier concentration, and also the periodicity of the crystals is disturbed, and the hopping conduction of the holes in Mn—O—Mn is inhibited, so that the B-constant increased by rise in the hopping probability accompanying the temperature rise.

Further, it is clear that, although the La deficiency is effective to improve the low specific electrical resistance and the B-constant, there is a problem in that, when the La deficiency is excessively included, the characteristics change in the heat cycle test. It has been confirmed that this deterioration phenomenon is more conspicuous in a heat cycle test that is performed up to a high temperature of about 240° C. It appears that, in order to compensate for the deficiency that has been excessively included, oxygen deficiency is included, and compensation of the deficiency or change in a degree of the deficiency state occurs during the heat cycle test to change the electrical resistance.

Here, in preferred embodiments of the present invention, a solid solution of $LaMnO_3$—$CaMnO_3$ and a solid solution of $LaMnO_3$—$SrMnO_3$ are used as a base. However, a comparatively large B-constant is able to be obtained with a high reliability and with a small specific electrical resistance even in a case in which La is replaced with another rare earth element. Also, the "La deficiency" in the above description means that the content of La per 1 mol of Mn contained in the ceramic material is smaller than 1 mol. In actual cases, both of La and Mn may be deficient.

In the same manner as described above, samples were prepared so as to obtain a composition shown in the following Table 4.

Figure 3:
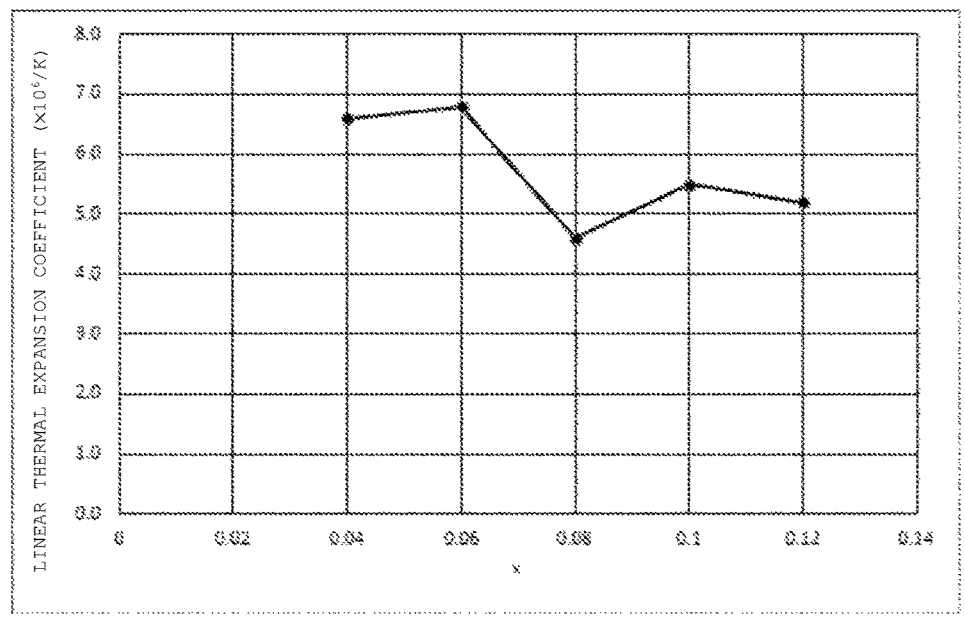
FIG. 3 is a graph showing a relationship of linear thermal expansion coefficient—x of samples in the Examples.

With respect to the obtained samples, the linear thermal expansion coefficient was measured by a thermal mechanical analyzing apparatus (TMA: Thermalmechanical Analyzer). An average thermal expansion coefficient from about 0° C. to about 50° C. is shown in the following Table 4 and FIG. 3. Here, the measurement conditions were set to be as follows.

Temperature profile: about −50° C.→about 350° C. (about 5° C./min)
Measurement atmosphere: $N_2$ (about 200 ml/min)
Load: about 10 gf

TABLE 4

| Sample No. | $La_{1-x}Ca_yMnO_3$ | | Characteristics test results Linear thermal expansion coefficient (×10⁶/K) |
|---|---|---|---|
| | x | y | |
| 38 | 0.040 | 0.030 | 6.6 |
| 39 | 0.060 | 0.030 | 6.8 |
| 40 | 0.080 | 0.030 | 4.6 |
| 41 | 0.100 | 0.030 | 5.5 |
| 42 | 0.120 | 0.030 | 5.2 |

From the above results, the ceramic material according to a preferred embodiment of the present invention has a comparatively small linear thermal expansion coefficient, and in particular, when x is about 0.08 or larger, the linear thermal expansion coefficient is about $6.0\times10^6$/K or less.

The ceramic materials according to preferred embodiments of the present invention may be used as a material for a thermistor element to reduce or minimize an inrush current. However, the present invention is not limited to such a purpose or use.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A resistive element comprising:
an element main body; and
at least two electrodes disposed such that at least a portion of the element main body is interposed therebetween; wherein
the element main body is composed of a ceramic material having a composition represented by a formula of:

$$La_{1-x-y}AE_yMnO_3,$$

in which AE is at least one of Ca and Sr;
x satisfies 0<x≤about 0.20; and
y satisfies 0<y≤about 0.10.

2. The resistive element according to claim 1, wherein
x satisfies about 0.03≤x≤about 0.20, and
y satisfies about 0.005≤y≤about 0.10.

3. The resistive element according to claim 1, wherein
(i) x satisfies about 0.03≤x≤about 0.20, and y satisfies about 0.005≤y≤about 0.07; or
(ii) x satisfies about 0.03≤x≤about 0.15, and y satisfies about 0.07<y≤about 0.10.

4. A resistive element comprising:
an element main body; and
at least two electrodes disposed such that at least a portion of the element main body is interposed therebetween; wherein
the element main body is composed of a ceramic material comprising:
a composite oxide of La, AE, and Mn; wherein
AE is at least one of Ca and Sr;
a sum of a molar content of La and a molar content of AE is smaller than about 100 parts by mol and about 80 parts by mol or larger relative to 100 parts by mol of Mn; and
the molar content of AE is larger than about 0 parts by mol and about 10 parts by mol or smaller relative to 100 parts by mol of Mn.

5. The resistive element according to claim 4, wherein
the sum of the molar content of La and the molar content of AE is about 97 parts by mol or smaller and about 80 parts by mol or larger relative to 100 parts by mol of Mn; and
the molar content of AE is about 0.5 part by mol or larger and about 10 parts by mol or smaller relative to 100 parts by mol of Mn.

6. The resistive element according to claim 4, wherein
(i) the sum of the molar content of La and the molar content of AE is about 97 parts by mol or smaller and about 80 parts by mol or larger relative to 100 parts by mol of Mn; and
the molar content of AE is about 0.5 part by mol or larger and about 7 parts by mol or smaller relative to 100 parts by mol of Mn; or
(ii) the sum of the molar content of La and the molar content of AE is about 97 parts by mol or smaller and about 85 parts by mol or larger relative to 100 parts by mol of Mn; and
the molar content of AE is larger than about 7 parts by mol and about 10 parts by mol or smaller relative to 100 parts by mol of Mn.

7. The resistive element according to claim 1, wherein the resistive element is a thermistor element to reduce an inrush current.

8. The resistive element according to claim 4, wherein the resistive element is a thermistor element to reduce an inrush current.

* * * * *